United States Patent Office 3,842,077
Patented Oct. 15, 1974

3,842,077
CEPHALOSPORANIC ACID DERIVATIVES
Peter Wolfgang Henniger, Leiden, Netherlands, assignor to American Home Products Corporation, Radnor, Pa.
No Drawing. Original application Dec. 17, 1970, Ser. No. 99,276, now Patent No. 3,813,385. Divided and this application Jan. 18, 1973, Ser. No. 324,627
Claims priority, application Great Britain, Dec. 18, 1969, 61,841/69
Int. Cl. C07d 99/16, 99/24
U.S. Cl. 260—243 C        2 Claims

ABSTRACT OF THE DISCLOSURE

Novel penicillanic acid and cephalosporanic acid derivatives of the formula

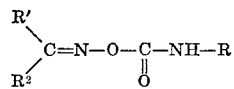

(I)

wherein R is selected from the group consisting of

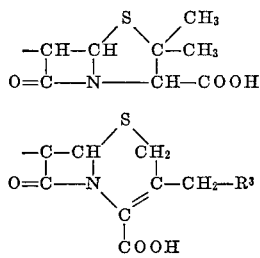

(II)

(III)

and

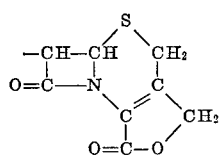

(IV)

R' is selected from the group consisting of hydrogen, lower alkyl, lower alkoxycarbonyl, lower alkanoyl, aryl, benzyl, heterocyclic of 5 to 6 atoms in the ring and the hereto atom is nitrogen, oxygen or sulfur linked through a carbon atom and a phenylmethylidene-hydroxyimino, $R_2$ is selected from the group consisting of lower alkyl, lower alkanoyl and phenyl and R' and $R^2$ together with the carbon atom to which they are attached form a cyclo-alkylidine of 5 to 8 carbon atoms, $R^3$ is selected from the group consisting of hydrogen and lower alkanoyloxy and the said aryl, benzyl and cycloalkylidene optionally are substituted with at least one member of the group consisting of halogen, lower alkyl and lower alkoxy and their non-toxic pharmaceutically acceptable salts, esters and amides and their preparation and their use as antibiotics.

This application is a division of application Ser. No. 99,276, filed Dec. 17, 1970 which issued as Pat. No. 3,813,385 on May 28, 1974.

OBJECTS OF THE INVENTION

It is an object of the invention to provide the novel acid derivatives of Formula I.

It is a further object of the invention to provide a novel process for the preparation of the compounds of Formula I.

It is another object of the invention to provide novel antibiotic compositions and a novel method of combatting bacterial infections in warm-blooded animals.

These and other objects and advantages of the invention will become obvious from the following detailed description.

THE INVENTION

The novel penicillanic acid and cephalosporanic acid derivatives of the invention are selected from the group consisting of compounds of the formula

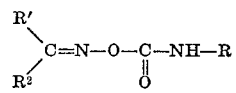

(I)

wherein R is selected from the group consisting of

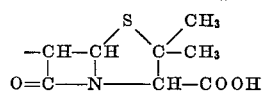

(II)

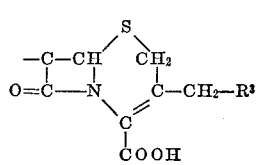

(III)

and

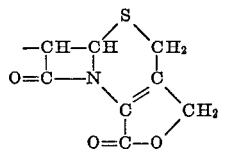

IV)

R' is selected from the group consisting of hydrogen, lower alkyl, lower alkoxycarbonyl, lower alkanoyl, aryl, benzyl, heterocyclic of 5 to 6 atoms in the ring and the hetero atom is nitrogen, oxygen or sulfur linked through a carbon atom and a phenyl methylidene-hydroxyimino, $R^2$ is selected from the group consisting of lower alkyl, lower alkanoyl and phenyl and $R^1$ and $R^2$ together with the carbon atom to which they are attached form a cyclo-alkylidene of 5 to 8 carbon atoms, $R^3$ is selected from the group consisting of hydrogen and lower alkanoyloxy and the said aryl, benzyl and cycloalkylidene optionally are substituted with at least one member of the group consisting of halogen, lower alkyl and lower alkoxy and their non-toxic, pharmaceutically acceptable salts, esters and amides.

Examples of R' are hydrogen; lower alkyl such as methyl, ethyl, propyl, n- or isobutyl, pentyl, hexyl, etc.; lower alkoxycarbonyl such as ethoxycarbonyl; lower alkanoyl such as acetyl, propionyl, etc.; aryl such as phenyl, naphthyl, halophenyl, toluyl, p-methoxyphenyl; benzyl; hetero groups such as pyridyl, lower alkyl pyridyl, furyl, thienyl, etc.; phenylmethylidene imino. When $R^3$ is alkanoyl, acetyl is preferred. Examples of suitable salts are $NH_4$, alkali metals, alkaline earth metals and amines. The term "lower" as applied in this specification to alkyl, alkoxycarbonyl, alkanoyl or alkanoyloxy groups means that the group in question contains not more than 6 carbon atoms. The amide derivatives of the acid compounds of general Formula I are those in which the hydroxy component of the carboxylic group is replaced by the saccharinyl, succinimido or phthalimido radical.

The compounds of formula (I) or esters thereof are obtained by reacting an oxime of the formula:

(V)

(wherein R' and R² are as hereinbefore defined) with an isocyanate compound of the formula $O=C=N-R^4$, wherein R⁴ is a group

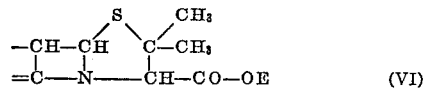
(VI)

or

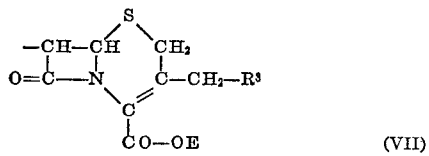
(VII)

wherein R³ is as hereinbefore defined and E is a silyl group of the formula $(R^5)_3Si-$, in which R⁵ is a lower alkyl, phenyl or phenyl (lower) alkyl group which is easily removable and replaceable by hydrogen to give a free carboxyl group or R⁴ is the group (IV) depicted above, and if desired when R⁴ is formula (VI) or (VII) liberating the acid of formula I from the resulting silyl ester by methods known per se. Preferably the symbol E represents a tri(lower)-alkylsilyl group and, more particularly, trimethylsilyl.

In a modification of the process, the saccharinyl, succinimido and phthalimido amide derivatives of acids of general formula I are obtained by reacting an oxime of general formula (V) with an isocyanate reactant $$O=C=N-R^4$$

in which the silyloxy group —OE of formula (VI) or (VII) is replaced by the saccharinyl, succinimido or phthalimido radical.

The oxime and isocyanate are preferably reacted in an inert anhydrous organic medium. Suitable organic solvents are, for example, anhydrous dichloromethane, chloroform, benzene, toluene, diethyl ether dimethylformamide and benzonitrile. The reaction is exothermic in many instances so that, generally, cooling of the reaction mixture is appropriate. Preferably the reaction between the oxime and isocyanate is effected at a temperature not exceeding 50° C. At a reaction temperature higher than 50° C., the yield of product may be deleteriously affected. Equimolar amounts of the reactants are normally used but sometimes, a small excess of the oxime is preferred. A basic catalyst, for example, a tertiary amine such as triethylamine or pyridine, may be added to the reaction mixture in relatively small amounts.

The penicillanic acid and cephalosporanic acid compounds of formula (I) can be isolated from the reaction mixture as the free carboxylic acids, as inorganic salts (e.g. sodium or potassium salts), as amine salts (e.g. N-ethylpyridine or procaine salt) or as silyl esters of amides (i.e. the saccharinyl, succinimido and phthalimido derivatives), or the lactone form when R represents the group of formula (IV). Isolation of the final products as salts may generally be carried out by taking up the reaction product in water, acidifying the aqueous solution, transferring the product into an organic solvent, adding a suitable salt-forming substance, and isolating the salt formed. Surprisingly, the free acids of formula I can be isolated readily when a silyl ester of the isocyanate is reacted with the oxime in a low-boiling solvent such as dichloromethane and the silyl ester product is hydrolysed in a homogeneous medium, for example by addition of a small excess of a low-boiling alcohol or by pouring the reaction mixture into a low-boiling and aqueous solvent such as aqueous acetone. A higher boiling solvent (e.g. ethyl acetate) is added to the resulting solution in both cases and the solution is evaporated until separation of a crystalline precipitate of the desired acid occurs.

The acid compounds so obtained can be converted by methods known per se into alkali metal and alkaline earth metal salts, or reacted with an equimolecular quantity of an amine to form amine salts of the acid. The amine salts may be derived from trialkylamines, including triethylamine, cyclohexylamine, dicyclohexylamine, N-ethylpyridine, N-ethylpiperidine, dibenzylamine, procaine and other amines which have been used to form salts with therapeutically useful pencillin or cephalosporin compounds.

The isocyanate starting materials used in the process of the invention of the formula $O=C=N-R^4$ (wherein R⁴ is as hereinbefore defined) can be obtained by reacting phosgene with a 6-aminopenicillanic or 7-aminocephalosporanic acid derivative of the formula $H_2N-R^4$, or a derivative thereof in which one of the hydrogen atoms of the amino group is replaced by a silyl group $(R^5)_3Si-$ (wherein R⁵ is as hereinbefore defined), preferably trimethylsilyl, in an inert anhydrous organic solvent to convert the amino or substituted-amino group into the isocyanato group without affecting the bicyclic nucleus R⁴. As organic solvents, toluene and dichloromethane or mixtures thereof are preferred. To facilitate the reaction, an organic base can be added to the reaction mixture to bind the hydrogen chloride formed and tertiary amines such as triethylamine and N-ethylpiperidine are advantageously used for this purpose.

The reaction of the amino compound $H_2N-R_4$, or derivative thereof, with phosgene must be carried out at very low temperatures; temperatures at or below —20° C., and preferably —40° C., are used with advantage. Destruction of the bicyclic nucleus in the radical R⁴ is thereby completely or virtually completely prevented.

The other isocyanate starting materials used in the process of the invention, i.e., the saccharinyl, succinimido and phthalimido amide derivatives of 6-isocyanatopenicillanic and 7-isocyanatocephalosporanic acid, can be prepared in a similar manner by the reaction of phosgene with the corresponding amide derivative of 6-aminopenicillanic or 7-aminocephalosporanic acid, or silylated derivative thereof.

The new penicillanic and cephalosporanic acid derivatives of formula (I) have antibiotic properties which make them useful as medicines for men and animals and as additives in animal feed. They are particularly active against gram positive microorganisms.

Preferred compounds of the invention are those wherein R¹ is hydrogen, methyl, ethoxycarbonyl, acetyl, phenyl, chloro-phenyl, pyridyl, or phenylmethylidene-hydroxyimine and R² is methyl, acetyl or phenyl group, or R¹ and R² together with the carbon atom to which they are attached form a cyclooctylidene group optionally substituted with chlorine.

The antibiotic compositions of the invention are comprised of a compound of formula I or their non-toxic, pharmaceutically acceptable salts, ester or amides and a pharmaceutical carrier. They are preferably employed for therapeutic purposes in the form of a non-toxic salt such as the sodium, potassium or calcium salt. Other salts that may be used in pharmaceutical preparations include the non-toxic, suitably crystalline salts with organic bases such as amines, for example trialkylamines, cyclohexylamine, procaine, dibenzylamine and N-alkylpiperidines.

When used for therapeutic purposes, the novel compounds may be used as such or in the form of a pharmaceutical preparation customarily employed for the administration of therapeutically active substances, especially antibiotics. The invention includes within its scope pharmaceutical preparations comprising, as the active ingredient, one of the novel compounds of the invention in association with a solid or liquid pharmaceutically acceptable carrier, preferably for oral administration. The penicillins as such, or in admixture with a solid or liquid diluent, may be included in capsules made of absorbable material, such as gelatin. The penicillins may be attached to or incorporated in a carrier substance in such a way that the active substance is released over an extended period of time after ingestion. Liquid preparations may be in the form of solutions suitable for parenteral administration. The usual individual dosage is 100 to 2000 mg.

The novel method of combatting bacterial infections in warm-blooded animals comprises administering an effective amount of a penicillin having formula VI, VII or VIII. The compounds may be administered orally, parenterally or rectally. The usual daily dose is 5 to 100 mg./kg., depending upon the method of administration and the specific compound. The compounds have been shown to be effective against gram positive bacteria.

In the following examples there are described several preferred embodiments to illustrate the invention. However, it should be understood that the invention is not intended to be limited to the specific embodiments.

EXAMPLE I

Preparation of 6-(isopropylideneiminooxy-carbonamido)penicillanic acid 0.77 g. (10.5 mmol) of acetone oxime, 0.05 ml. of pyridine and 10 ml. of anhydrous dichloromethane were placed into a 50 ml. three-necked round-bottomed vessel provided with a thermometer, a gas inlet tube and a dropping funnel and the mixture was stirred several minutes at room temperature until a clear solution was obtained. Under a nitrogen atmosphere, a solution of 3.14 g. (10 mmol) of the trimethylsilyl ester of 6-isocyanatopenicillanic acid in 25 ml. of anhydrous dichloromethane was added dropwise to the stirred solution. The reaction was exothermic and therefore, the reaction temperature was maintained between 20 and 25° C. by means of a water bath. After addition of the isocyanate solution, it appeared that at least 90% of the isocyanate was changed into another compound, as determined by a thin-layer chromatographic test. The solvent was evaporated off in vacuo at 0° C. and a solution of 0.45 ml. of absolute ethanol in 50 ml. of anhydrous acetone was added at 0° C. to the residue. Substantially all the volatile substances were evaporated in vacuo as it appeared that the product did not crystallize as a free acid directly from acetone. 25 ml. of ethyl acetate were added to the oily residue, and the solution was concentrated to a small volume. 10 ml. of anhydrous hexane were added to the stirred residue and an oil precipitated. The supernatant layer was decanted off and the oil was dissolved in 10 ml. of anhydrous acetone. An amount of anhydrous hexane (about 1 to 5 ml.) was added to the stirred solution sufficient to cause a weak turbidity. The turbid solution obtained was stirred 60 minutes at 0° C. and a crystalline product was formed gradually. Another 5 ml. of hexane were added carefully. The mixture was allowed to stay for 60 minutes at —10° C. and the solid was filtered off, washed with a mixture of acetone and hexane, and finally washed with hexane. The product was dried in vacuo to obtain 2.0 g. of 6-(isopropylideneiminooxycarbonamido)-penicillanic acid. The mother liquor still contained considerable amounts of the desired compound.

According to thin-layer chromatographic and PMR spectrometric tests, the compound contained only about 10% of impurities (chiefly acetone and hexane residues) and clear PMR and IR spectra were obtained from the final product confirming the formula. Analysis of the PMR spectrum of the product obtained (dissolved in hexa- deuterodimethylsulphoxide; 60 Mc; δ-values in p.p.m., internal reference: tetramethylsilane):

$C_3$—$CH_3$ _____ 1.53 (3 protons) and 1.62 (3 protons).
$CH_3$ isopropylidene ____ 1.98 (3 protons) and 2.00 (3 protons).
$C_2$—H _____ 4.33.
$C_5$—H and $C_6$—H (multiplet J≈4.0 and J'≈8.0 c.p.s.) _____ 5.34→5.63 (2 protons).
N—H doublet (J'≈8.0 c.p.s.) _____ 7.66 and 7.80.
COOH (broad signal) __ About 8.5.

Partial analysis of the IR spectrum (KBr-disk, cm.$^{-1}$):

3350 N—H
1778 C=O β lactam
1747 C=O iminooxycarbonyl
1690 C=O carboxyl
1520 N—H deformation

EXAMPLE II

Preparation of 6-[(1-phenylethylidene)iminooxycarbonamido]-penicillanic acid

Using the process of Example I, 1.47 g. (10.9 mmol) of acetophenone oxime in 40 ml. of anhydrous dichloromethane were reacted with 3.25 g. (10.4 mmol) of the trimethylsilyl ester of 6-isocyanatopenicillanic acid in the presence of a catalytic amount of pyridine and the reaction was exothermic. A thin layer chromatographic test showed that at least 90% of the isocyanate was changed into one single reaction product. The reaction mixture was cooled to —8° C. and 0.55 ml. of absolute ethanol were added in order to decompose the silyl ester. After addition of 40 ml. of ethyl acetate, the solution was evaporated in vacuo to a final volume of about 25 ml. The solution was poured slowly into a vigorously stirred ice-cold mixture of water and diethyl ether, and simultaneously dilute NaOH was added to obtain a pH of 6.5. The layers obtained were separated and the aqueous layer was extracted twice with small amounts of diethyl ester. The organic layers were combined and washed twice with ice-water. The pH of the combined aqueous layers was adjusted to 3.5 by addition of dilute HCl. The acid solution was extracted three times with a mixture of 1 part of diethyl ether and 3 parts of ethyl acetate. The combined organic layers were washed twice with a small amount of ice-water, dried over magnesium sulphate and evaporated in vacuo at 0° C. to a volume of 25 ml. 5 ml. of anhydrous and pure ethyl acetate were added and the solution was dried over calcium sulfate and filtered. 15 ml. of diethyl ether were added to the filtrate, causing a weak turbidity and then 15 ml. of anhydrous hexane were added to the stirred mixture. A colorless, very hygroscopic and amorphous precipitate was formed. The greater part of the ether was evaporated in vacuo and a bright yellow oil was formed. The oil was cooled to —15° C. and the somewhat turbid supernatant liquid was decanted. The oil was stirred several times with anhydrous hexane and the decanted turbid ethyl acetate-hexane layers were combined, and a small amount of acetone was added until the turbidity disappeared. The solution was allowed to stand at 0° C. and a considerable amount of a crystalline product was formed. Thin-layer chromatographic analysis showed that this was 6-[(1-phenylethylidene)iminooxycarbonamido]-penicillanic acid. Further purification of the crystalline product was not carried out.

5 ml. of acetone were added to the residual semi-solid oil and scratching with a glass rod caused formation of a crystalline product which was filtered off and consecutively washed with small amounts of cold acetone, diethyl ether and hexane. The product was dried in vacuo and another 1.0 g. of the desired final product was obtained. Thin-layer chromatography showed that the product was free from impurities containing sulphur. The proposed structure was confirmed by the IR and PMR spectra, which showed moreover that the final product was pure, except for the presence of a small amount of acetic acid. Analysis of the PMR spectrum of the final product (dissolved in hexadeuterodimethylsulphoxide; 60 Mc; δ-values in p.p.m.; internal reference: tetramethylsilane):

| | |
|---|---|
| $C_3$—$CH_3$ | 1.55 (3 protons) and 1.65 (3 protons). |
| C—$CH_3$ | 2.42 (3 protons). |
| $C_2$—H | 4.41. |
| $C_5$ and H and $C_6$—H (multiplet, J≈4.0; J'≈8.0 c.p.s.) | 5.42→5.68 (2 protons). |
| $C_6H_5$+COOH (multiplet superimposed on a low broad signal derived from the carboxyl proton and a small amount of moisture) | 7.3→8.3 (about 6 protons). |
| N—H (doublet, J'≈8.0 c.p.s.) | 7.99 and 8.12. |

EXAMPLE III

Preparation of 6[(1-2'-pyridyl-ethylidene)iminooxycarbonamido]-penicillanic acid Using the procedure of Example I, 0.8 g. (5.9 mmol) of 2-acetylpyridine oxime was reacted with 1.88 g. (6.0 mmol) of the trimethylsilyl ester of 6-isocyanatopenicillanic acid in 30 ml. of anhydrous dichloromethane in the presence of a catalytic amount of pyridine and the reaction was exothermic. A thin-layer chromatographic test showed conversion of at least 90% of the penicillanic ester immediately after the addition of the isocyanate, solution was finished and the reaction mixture was poured into 50 ml. of stirred aqueous acetone. The solution was dried over calcium sulfate, filtered, evaporated in vacuo to about 30 ml., dried again over calcium sulfate, filtered and evaporated in vacuo to about 5 ml. Crystallization of the product was not observed and therefore, 15 ml. of ethyl acetate and 10 ml. of hexane were added subsequently in the cold. The solution was evaporated in vacuo and spontaneous crystallization now occurred. The crystalline mass was filtered off and treated as in Example I to obtain a yield of 650 mg. of 6-[(1-2'-pyridyl-ethylidene)-iminooxycarbonamido]-penicillanic acid.

A thin-layer chromatographic test showed that in addition to the desired product, the final product contained only a very small amount of a by-product containing sulphur, and a very small quantity of residual solvent. The structure was confirmed by the IR spectrum. Partial analysis of the IR spectrum of the final product (dissolved in KBr-disk and in chloroform, concentration about 10 mg./ml.; values in cm.$^{-1}$).

| KBr | $CHCl_3$ | |
|---|---|---|
| 1775 | 1788 | C=O β-lactam. |
| | About 3500 | O–H acid. |
| 3340 | 3410 | N–H. |
| 1710 | ((About 1735)) | C=O acid. |
| 1754 | ((Broad abs.)) | C=O iminooxyearbonyl. |
| 1625, 1575, 1512 | 1630, 1580, 1492 | C=C and C=N. |

EXAMPLE IV

Preparation of 6-[(2,6-dichlorophenyl)methylidene-iminooxycarbonamido]-penicillanic acid A solution of the trimethylsilyl ester of 6-isocyanatopenicillanic acid in dichloromethane was added dropwise at room temperature to a suspension of 2,6-dichlorobenzaldoxime (m.p. 150° C.) in an anhydrous dichloromethane in the presence of a catalytic amount of pyridine, a small excess of the oxime being present. Very little heat formation was observed and the product formed did not appear to have a good solubility in dichloromethane, as was the case with the oxime. The reaction product formed was poured into cooled aqueous acetone and a thin-layer chromatographic test showed a conversion of penicillanic ester starting material of at least 85%. Crystallization of the product of the above formula was obtained in the same way as described in Example II and a thin-layer chromatographic test showed that the 6-[(2,6-dichlorophenyl)methylideneiminooxycarbonamido] - penicillanic acid was free from impurities containing sulphur. The proposed structure was confirmed by the IR spectrum. Partial analysis of the IR spectrum of the final product (KBr-disk, cm.$^{-1}$):

| | |
|---|---|
| 3356 | N—H. |
| 3080 | =C—H. |
| 1788 | C=O β lactam. |
| 1750 | C=O iminooxycarbonyl. |
| 1722 | C=O carboxyl. |
| 1610, 1588, 1555 | C=C aromatic. |
| 1510 (shoulder) 1497 | N—H def. and/or C=C aromatic and/or C=N. |

EXAMPLE V

Preparation of the sodium salt of 6-(diphenylmethylidene-iminooxycarbonamido)-penicillanic acid Using the process of Example IV, 2.37 g. (13.7 mmol) of benzophenoneoxime were reacted with 3.52 g. (11.2 mmol) of the trimethylsilyl ester of 6-isocyanatopenicillanic acid. The reaction was exothermic and a thin-layer chromatographic test showed a conversion of starting material of at least 90%. Attempts to isolate the product of the above formula as its free acid directly from the reaction mixture or from a solution in ethyl acetate extracted from water, failed. Addition of a solution of sodium ethylcapronate in ethyl acetate to the solution of 6 - [diphenylmethylideneiminooxycarbonamido] - penicillanic acid in about 40 ml. of ethyl acetate give the sodium salt of the compound in a yield of 2.57 g. According to thin-layer chromatography, a small amount of an impurity containing sulphur was present. From the PMR spectrum, it was concluded that the purity of the isolated compound was about 90%. Partial analysis of the PMR-spectrum of the sodium salt obtained (dissolved in $D_2O$, 60 Mc, δ-values in p.p.m., internal reference: 2,2-dimethyl-silapentane-5-sulphonate) was as follows:

| | |
|---|---|
| $C_3$—$CH_3$ | 1.70 (6 protons). |
| $C_2$—H | 4.68. |
| $C_5$—H and $C_6$—H | 5.5→6.0 (2 protons). |
| $C_6H_5$ | 6.7→7.85 (10 protons). |

Partial analysis of the IR spectrum (KBr-disk, cm.$^{-1}$):

| | |
|---|---|
| 3380 | N—H. |
| 3060 | =C—H. |
| 1788 | C=O, β-lactam. |
| 1760 | C=O, iminooxycarbonyl. |
| 1600 | C=O carboxylate ion+C=C aromatic. |
| 1480 | N—H def. and/or C=C aromatic. |
| 754 and 687 | Aromatic substituents. |

EXAMPLE VI

Preparation of 6-[(3-butanone-2-ylidene)iminooxycarbonamido]-penicillanic acid

Using the process of Example I, 2,3-butanedione monooxime was reacted with the trimethylsilyl ester of 6-isocyanatopenicillanic acid in dichloromethane in the presence of a catalytic amount of pyridine, the oxime being slightly in excess. The reaction was finished within one hour at 25° to 30° C. In contrast to the preceding Examples in which the reaction was carried out at about 20° C., some heating was necessary. A thin-layer chromatographic test showed a conversion of over 80% of the penicillanic ester starting material. The silyl ester was carefully homogeneously hydrolyzed and the solvent was evaporated in vacuo. The residue was taken up in ethyl acetate and the compound was dissolved in water at pH 7. The aqueous solution was extracted with a mixture of diethyl ether and ethyl acetate at a pH of 3.5 giving a fairly pure solution. The solution was completely evaporated and the semi-solid oil obtained was extracted several times with pure chloroform. The IR spectrum of the solution confirmed the structure of 6-[(3-butanone-2-ylidene)iminooxycarbonamido]-pencillanic acid. By complete evaporation of the solution, the desired compound was isolated as an amorphous, colorless solid and according to thin-layer chromatography, the purity of the compound was estimated as at least 85%. Partial analysis of the IR spectrum of the compound (dissolved in chloroform, concentration about 10 mg./ml., cm.$^{-1}$)

| | |
|---|---|
| 3410 | N—H. |
| 1788 | C=O β lactam. |
| 1750 | C=O iminooxycarbonyl. |
| About 1710 (two nearly coincident very intensive absorptions) | C=O carboxyl and C=O acetyl. |

EXAMPLE VII

Preparation of 6-[1-ethoxycarbonyl-2-oxopropane-1-ylidene)iminooxycarbonamido]-pencillanic acid Using the process of Example VI, the ethyl ester of 3-oxo-2-oximinobutyric acid was reacted with the trimethylsilyl ester of 6-isocyanatopenicillanic acid and the reaction was slightly exothermic. The silyl ester was hydrolysed by addition of a calculated amount of ethanol. The solvent was evaporated in vacuo and the residue was extracted with pure chloroform giving a fairly pure solution of 6-[1-ethoxycarbonyl-2-propane-1-ylidene)iminooxycarbonamido]-pencillanic acid. The structure of the product was confirmed by IR spectrum of the solution.

EXAMPLE VIII

Preparation of 6-[(1,2-diphenyl-2-hydroxyiminoethylidene)iminooxycarbonamido]-pencillanic acid A solution of 1.00 g. (3.18 mmol) of the trimethylsilyl ester of 6-isocyanatopenicillanic acid in 15 ml. of dichloromethane was added dropwise at room temperature under a nitrogen atmosphere to a stirred solution of 1.53 g. (6.37 mmol) of α-benzildioxime in 15 ml. of purified anhydrous dimethylformamide containing a small amount of pyridine. The reaction was exothermic and a thin layer chromatographic test, made of the isocyanate after stirring the reaction mixture for 1 hour, showed a conversion of at least 90% into the reaction product. The reaction mixture was poured into ice-water, and a precipitate was formed, which appeared to be α-benzildioxime. Diethyl ether was added and the pH was lowered to about 2.5 by addition of 1N HCl. As the α-benzildioxime was substantially insoluble also in acidified water as in the organic layer, the organic layer could be separated. The mixture of precipitate and water was extracted twice with diethyl ether. The combined organic layers were washed twice with a small amount of ice-water and were filtered, dried over anhydrous magnesium sulfate and refiltered. A clear ether solution was obtained and a thin-layer chromatographic test thereof showed only one compound containing sulphur. The solution was evaporated in vacuo as much as possible to form a substantially colorless oil. The oil was stirred several times with anhydrous diethyl ether and subsequently dissolved in acetone. The solution was evaporated in vacuo to a small amount and a precipitate was formed. The precipitate was filtered off, washed with diethyl ether and dried to obtain 770 mg. of 6-[(1,2-diphenyl-2-hydroxyiminoethylidene)iminooxycarbonamido]-pencillanic acid. A PMR spectrum of the final product showed that it consisted of about 83% by weight of the said penicillin, 9% by weight of α-benzildioxime and 8% of diethyl ether. Analysis of the PMR spectrum of the final product, dissolved in hexadeuterodimethyl-sulphoxide (60 Mc, δ-values in p.p.m., internal reference tetramethylsilane):

| | |
|---|---|
| CH$_3$ | 1.39 and 1.46. |
| C$_2$—H | 4.28. |
| C$_5$—H and C$_6$—H | 5.15→5.65 (multiplet). |
| (C$_6$H$_5$)$_2$+N—N | About 7.5. |
| =N—OH | About 12.3. |

In an experiment, in which an excess of the trimethylsilyl ester of penicillanic acid was used, the same final product was formed.

EXAMPLE IX

Preparation of 6-[(2-chlorocyclooctylidene)-iminooxycarbonamido]-pencillanic acid Under a nitrogen atmosphere, a solution of 1.255 g. (4 mmol) of the trimethylsilyl ester of 6-isocyanatopenicillanic acid in 10 ml. of dichloromethane was added dropwise to a stirred solution of 703 mg. (4 mmol) of 2-chlorocyclooctanone oxime in 10 ml. of dichloromethane. The reaction was carried out at 30° C. in the presence of a small amount of pyridine catalyst, and was exothermic. The mixture was stirred for one hour and a thin-layer chromatographic test, made after the stirring period, showed a conversion of at least 95% of the isocyanate into a single reaction product.

4 mmol of absolute ethanol was added to the reaction mixture at −5° C. followed after several minutes by the addition of 25 ml. of pre-cooled pure ethyl acetate to decompose the silyl ester. The mixture was evaporated in vacuo to a small volume without any crystallization. The residue was dissolved in ethyl acetate and was poured into 40 ml. of ice-water with the pH being maintained at 7.0 by the simultaneous addition of dilute NaOH. Diethyl ether was added and the organic layer was separated and extracted twice with 5 ml. each of ice-water. 25 ml. of ethyl acetate were added to the combined aqueous layers, and the pH of the stirred mixture was adjusted to 4.0 by addition of dilute HCl. The layers were separated and the aqueous layer was extracted with another 10 ml. of ethyl acetate. The ethyl acetate layers were combined and extracted twice with a small amount of ice-water, dried over anhydrous magnesium sulfate, filtered and concentrated in vacuo to a small volume. No crystalline product was formed. As the residue was substantially pure, ethyl acetate residues were removed in vacuo as much as possible and 1.37 g. of a colorless amorphous solid were obtained.

The PMR spectrum of the final product, dissolved in hexadeutero-dimethylsulfoxide showed that the product contained 0.5 mol of ethyl acetate per mol of 6-[(2-chlorocyclooctylidene) - iminooxycarbonamido]-pencillanic acid with no visible other impurities present. Therefore the yield was about 50%. The structure of the final product was confirmed by IR and PMR spectra. The IR spectra of the compound in a KBr-disk, and dissolved in chloroform showed the following characteristic absorptions (measured in cm.$^{-1}$):

| | |
|---|---|
| About 3405 | —H. |
| 1790 | C=O β-lactam. |
| About 1715→1765 | C=O iminooxycarbonyl +C=O carboxyl. |
| 1495 | Probably N—H def. |
| 750 | C—Cl. |

As the intensive carbonyl frequencies were unusually broadened, special attention was paid to the PMR spectra (60 Mc, δ-values in p.p.m., internal reference: tetramethylsilane):

| 2-chlorocyclooctanone oxime in CDCl₃ | Final product in— | |
|---|---|---|
| | CD₃—CO—CD₃ | CD₃—SO—CD₃ |
| CH₃ | 1.60 | 1.51. |
| CH₃ | 1.67 | 1.62. |
| C₂—H | 4.46 | 4.31. |
| C₅—H, C₆—H | 5.45–5.74 sharp multiplet | 5.33–5.62. Less sharp multiplet. |
| N—H | About 7.2 unsharp doublet | 8.08; 8.21; 8.15; 8.28 less sharp quadruplet. |
| COOH | 7.7 (+H₂O) | Not visible. |
| C₆H₁₂ | 0.8–3.2 | 0.8–3.2 | 0.7–3.2. |
| CHCl | 4.47; 4.58; 4.61; 4.72 sharp quadruplet. | 4.64; 4.75; 4.78; 4.89 less sharp quadruplet. | 4.7–5.0 unsharp multiplet. |
| =N—OH | About 8.8 | | |

The PMR spectrum and the sharp melting point, which the oxime product possessed, indicate that it was pure and was not a mixture of the syn and anti configurations. The quadruplet for NH, observed in the PMR spectra of the solution in hexadeuterodimethylsulfoxide is an indication that the compound in this solution, and possibly in the solid state, is present in about equal amounts of two isomers. Probably the isomers are the syn and the anti isomer.

EXAMPLE X

Preparation of 7-[(1-phenylethylidene)iminooxycarbonamide]-cephalosporanic acid

A solution of 1.24 g. (3.34 mmol) of the trimethylsilyl ester of 7-isocyanatocephalosporanic acid in 20 ml. of toluene was added dropwise to a stirred solution of 0.473 g. (3.5 mmol) of acetophenone oxime in 10 ml. of anhydrous dichloromethane in the presence of a catalytic amount of pyridine. The reaction was carried out under a nitrogen atmosphere and during the addition which lasted about 20 minutes, the temperature of the reaction mixture increased from 18° to 25° C. A thin-layer chromatographic test, made immediately thereafter, showed a substantially complete conversion of the isocyanate into 7-[(1 - phenylethylidene)iminooxycarbonamido]-cephalosporanic acid. The reaction mixture was poured into 50 ml. of stirred ice-water with the pH being maintained at 7.0 by addition of 0.1N NaOH. The layers formed were separated and the said product appeared to be present in the aqueous layer. 25 ml. of ethyl acetate were added to the aqueous layer and dilute HCl was added to the stirred mixture to give pH 3.0. The layers formed were separated and the aqueous layer was extracted with 25 ml. of ethyl acetate so that only a very small residue of the product remained in the aqueous layer. The combined ethyl acetate layers were washed twice with 5 ml. of ice-water. The ethyl acetate solution of the product was dried over magnesium sulfate, filtered and evaporated in vacuo to a very small volume. The product neither crystallized spontaneously as the free acid nor did it do so as its sodium salt. Therefore, the substantially pure solution was evaporated to dryness. The solid obtained, which was slightly colored, was washed with diethyl ether and dried in vacuo to obtain 1.2 g. of the product. A thin-layer chromatographic test showed the presence of only one compound containing sulphur. The PMR spectrum showed the presence of a small amount of ethyl acetate and acetic acid impurities. The final product formed an N-ethylpiperidine salt. Partial analysis of the IR spectrum (KBr-disk and chloroform solution, about 10 mg./ml., values in cm.⁻¹):

| KBr | CH₃Cl | |
|---|---|---|
| About 3,350 | 3,500 | OH acid. |
| | 3,400 | NH. |
| About 2,650 | | OH acid. |
| About 1,780 | 1,787 | C=O β-lactam. |
| About 1,730 [1] | [1] 1,730 | C=O ester plus C=O carbonyl plus C=O iminooxycarbonyl. |
| 1640–1620 | 1,622 | C=N plus possibly NH def. |
| 1,570, 1,500 | 1,596, 1,495 | C=C plus possibly NH def. or C=N. |
| About 1,220, 1,022 | 1,020 | C—O—C ester. |
| 760, 686 | | Monosubstituted aromatic nucleus. |

[1] Very intensive wide band, which might represent three intensive C=O stretch vibrations.

Analysis of the PMR spectrum of the final product dissolved in hexadeuterodimethylsulfoxide (60 Mc δ-values in p.p.m., internal reference tetramethylsilane):

| | |
|---|---|
| C₃—CH₃ | 2.08 (3 protons). |
| N=C—CH₃ | 2.40 (3 protons). |
| S—CH₂ (center of an AB-quadruplet presenting very weak outer absorption lines) | 3.63 (2 protons). |
| O—CH₂ (AB quadruplet, $J_{gem}=12.2\pm0.2$ c.p.s.) | 4.64, 4.86, 5.00, 5.22 (2 protons). |
| C₆—H ($J=4.8\pm0.2$ c.p.s.) | 5.18, 5.26 (1 proton). |
| C₇—H ($J=8.7\pm0.3$ c.p.s., $J=4.8\pm0.2$ c.p.s.) | 5.58, 5.66, 5.73, 5.81 (1 proton). |
| C₆H₅ (multiplet) | 7.4→8.1 (5 protons). |
| N—H ($J'=8.7\pm0.3$ c.p.s) | 8.47, 8.61 (1 proton). |

EXAMPLE XI

Preparation of 7-[(1-phenylethylidene)iminooxycarbon-amido]-desacetoxycephalosporanic acid Using the procdure of Example X, 473 mg. (3.5 mmol) of acetophenone oxime were reacted with 1.05 g. (3.34 mmol) of the trimethylsilyl ester of 7-isocyanato-desacetoxycephalosporanic acid, followed by hydrolysis and recovery of 1.0 g. of 7-[(1-phenylethylidene)iminooxycarbonamido]-cephalosporanic acid.

ANTIBIOTIC ACTIVITY

The antibiotic activity against gram-positive microorganisms was determined from the results obtained in the following agar serial dilution test:

A stock solution of the compound at 2,000 µg./ml. was prepared in a sterile suitable vehicle. Two-fold dilutions were made with sterile 1/20 Mol. phosphate buffer pH 6.5 ($KH_2PO_4$—NaOH) and 1 ml. quantities of each dilution were incorporated in 19 ml. brain-heart infusion agar in sterile Petri dishes. The hardened surface was inoculated with test-organisms and incubated 24 hours at 37° C. The minimal inhibitory concentration of the compound (MIC), i.e., the least amount of antibiotic that completely inhibited the test organism, was expressed in µg./ml. and the MIC values of the compounds identified above are shown in Table I. The compounds tested were 6-(isopropylideneiminooxycarbonamido)-penicillanic acid (A), 6-[(1-phenylethylidene)-iminooxycarbonylamido]-penicillanic acid (B), 6-[(1,2'-pyridyl-ethylidene)iminooxycarbonamido] - penicillanic acid (C), 6-[(2,6-dichlorophenyl)methylideneiminooxycarbonamido]-penicillanic acid (D), 6-(diphenylmethylideneiminooxycarbonamido)-penicillanic acid (E), 6-[(1,2-diphenyl-2-hydroxyiminoethylidene) - iminooxycarbonamido]-penicillanic acid (F), 6-[(2-chlorocyclooctylidene)iminooxycarbonamido]-penicillanic acid (G), and 7-[(1 - phenylethylidene)iminooxycarbonamido) - cephalosporanic acid (H).

TABLE I

| Compound | MIC values in µg./ml. | | | | | | | |
|---|---|---|---|---|---|---|---|---|
| | A | B | C | D | E | F | G | H |
| Microorganism: | | | | | | | | |
| Bacillus subtilis 6633 | 0.15 | 0.86 | 2.5 | 0.25 | 0.2 | 1.2 | 0.02 | 2.5 |
| Staphylococcus aureus: | | | | | | | | |
| A 55 | 0.6 | 0.1 | 0.5 | 0.1 | 0.1 | 0.25 | 0.02 | 3 |
| A 321 | 0.3 | 0.1 | 2 | 0.15 | 0.2 | 0.6 | 0.05 | 6 |
| A 355 [1] | 9 | 12.5 | 25 | 20 | 25 | 6 | 3 | 12.5 |
| L 160a [1] | 50 | 25 | 40 | 40 | 50 | 6 | 6 | 12.5 |
| Streptococcus heamolyticus A 266 | 0.25 | 0.08 | 1.5 | 1.5 | 1 | 6 | 0.02 | 2 |
| Streptococcus faecalis L 80 | 40 | 40 | 75 | 100 | 75 | 100 | 6 | >100 |
| Diplococcus pneumoniae L 54 | 0.6 | 0.25 | 1.5 | 25 | 2 | 6 | 0.2 | 12.5 |

[1] Penicillinase forming micrcorganism.

Various modifications of the compositions and method of the invention may be made without departing from the spirit or scope thereof and it is to be understood that the invention is to be limited only as defined in the appended claims.

What is claimed is:
1. A compound selected from the group consisting of 7-[(1 - phenylethylidene)iminooxycarbonamido]-cephalosporanic acid and its non-toxic alkali metal, and alkaline earth metal salts.
2. A compound selected from the group consisting of 7-[(1-phenylethylidene)iminooxycarbonamido] - desacetoxycephalosporanic acid and its non-toxic alkali metal, and alkaline earth metal salts.

References Cited
UNITED STATES PATENTS
3,748,238   7/1973   Wolf et al. _____ 260—243 C NICHOLAS S. RIZZO, Primary Examiner U.S. Cl. X.R.
424—246, 271